(12) United States Patent
Moulsley

(10) Patent No.: US 6,307,863 B1
(45) Date of Patent: Oct. 23, 2001

(54) TRANSMISSION METHOD AND COMMUNICATION SYSTEM EMPLOYING THE METHOD

(75) Inventor: Timothy J. Moulsley, Caterham (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/141,643

(22) Filed: Aug. 27, 1998

(30) Foreign Application Priority Data

Sep. 5, 1997 (GB) .................................................. 9718743

(51) Int. Cl.[7] .................................................. H04B 7/212
(52) U.S. Cl. .......................... 370/442; 370/345; 370/347
(58) Field of Search .................................... 370/442, 443, 370/444, 345, 347, 321, 320, 479, 335, 342, 441, 468, 480, 481, 501, 503, 506; 375/346, 347

(56) References Cited

U.S. PATENT DOCUMENTS

| 6,005,855 | * | 12/1999 | Zehavil | 370/335 |
| 6,173,005 | * | 1/2001 | Kotzin | 375/141 |
| 6,185,200 | * | 2/2001 | Prasad | 370/342 |

* cited by examiner

*Primary Examiner*—Douglas Olms
*Assistant Examiner*—Ricardo M. Pizarro
(74) *Attorney, Agent, or Firm*—Dicran Halajian

(57) ABSTRACT

In a transmission system employing TDMA, the allocation of time segments for a particular transmission is synchronised with the creation of data packets for transmission over the channel. This reduces transmission delays. Either the timing of data packets or the division of the channel into segments for TDMA may be variable.

15 Claims, 3 Drawing Sheets

TRANSMISSION METHOD AND COMMUNICATION SYSTEM EMPLOYING THE METHOD

FIELD OF THE INVENTION

This invention relates to a transmission method for communication signals, and to a communication system employing the method. The invention is particularly concerned with systems employing time division multiple access (TDMA) channel sharing.

BACKGROUND OF THE INVENTION

In known TDMA systems, a predetermined series of time segments of a transmission channel is allocated to the transmission of a particular data signal. The allocation of time segments of the channel is independent of the timing of the data input. It is also known to provide a queue of signals awaiting transmission and to provide that more urgent data may jump to the front of the queue for transmission using the next available allocated time segment.

For certain types of data communication there is a need to reduce as far as possible the transmission delay, for example for a two way speech or video transmission. A problem with existing TDMA systems is that delays may arise between the preparation of data packets for transmission and the availability of allocated time segments for that data.

SUMMARY OF THE INVENTION

According to the invention there is provided a method of transmitting a plurality of communication signals over a channel using time division multiple access sharing of the channel, each communication signal comprising a data sequence which is divided into data packets for transmission over the channel during respective subsequent time segments of the channel, characterised in that the division of each communication signal into data packets is synchronised with the allocation of time segments of the channel to the respective signal.

The synchronisation of the allocation of time segments with the creation of data packets can be made to eliminate any delays which are conventionally introduced while a prepared data packet is awaiting the next allocated time segment for transmission. The creation of data packets may be timed so that the allocated time segment is available shortly after creation of the data packet. In this case the predetermined allocation of time segments may be maintained. However, the allocation of time segments may alternatively be varied so that a time segment is allocated to a communication signal shortly after the creation of a data packet from the respective signal.

Interleaving may be employed in the transmission method, such that each data packet is transmitted using a block of successive time segments of the channel, so that the division of each communication signal into data packets further comprises the spreading of data from each packet into data portions for respective time frames of the block, and the timing of the start of a block of time segments is then synchronised with the creation of the data portions.

When the invention is applied to a transmission system employing interleaving, the sampling of the data signal may be timed so that the first time segment within a block of time segments is available shortly after generation of the interleaved data packets. Alternatively, the timing of the time segments may be varied such that the first time segment of a block of time segments is available shortly after creation of the interleaved data packets.

The invention also provides a radio transmission system for performing the transmission method of the invention.

BRIEF DESCRIPTION OF THE DRAWINGS

The invention will now be described by an example with reference to, and as shown in, the accompanying drawings in which.

DETAILED DESCRIPTION OF THE INVENTION

Figure 1:
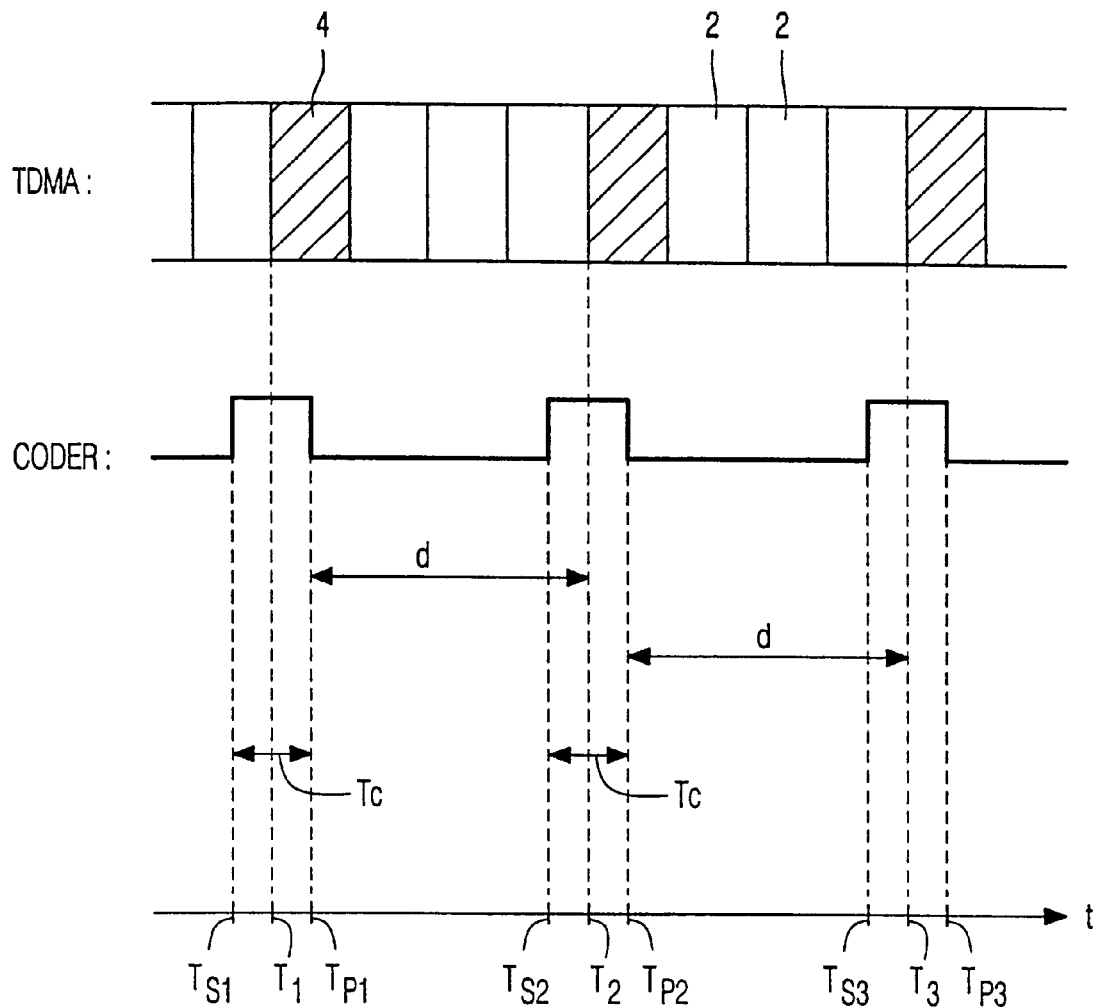
FIG. 1, shows the possible time delays incurred in a conventional TDMA transmission system.

FIG. 1 is a timing diagram illustrating the allocation of packets of data to allocated time segments of a channel divided using time division multiple access. For the purposes of illustration, it is assumed that the channel is divided in time into time segments 2, and one in every four of the segments (shown as a hatched area 4 in FIG. 1) is allocated to the transmission of a particular data signal. The data to be transmitted in the allocated time segments 4 of the channel is quantised into data packets by a coder such as a speech codec. One or more data packets may be transmitted in each time segment. Preferably, the coder is triggered by an internal clock at a sampling rate corresponding to the time period between successive allocated time segments 4. in this case, one data packet is generated for each time segment.

In FIG. 1 the coder is triggered at sampling instants $T_{s1}$, $T_{s2}$, $T_{s3}$ and so on. In order to quantise the incoming data into packets, the coder requires a certain length of time, denoted $T_c$ in FIG. 1. Thus, data packets are available for transmission over the allocated time segments at times $T_{p1}$, $T_{p2}$, $T_{p3}$ and so on. Thus, in FIG. 1 the high signals in the coder signal correspond to time periods during which the coder is quantising incoming data to generate data packets.

In conventional TDMA systems timing information concerning the allocation of time segments must be shared between the transmitter and the receiver to ensure that the receiver can correctly interpret the incoming modulated signal. However, the generation of data packets for transmission is performed independently, and therefore the operation of the coder is governed by a separate independent timing system.

FIG. 1 represents the situation when the coder is controlled by a sampling signal which is timed such that data packets are available (at instants $T_{p1}$, $T_{p2}$ and $T_{p3}$) shortly after the beginning of each allocated time segment 4 (at instants $T_1$, $T_2$ and $T_3$). As a result, the quantised data packet is subjected to a delay "d" before the next available data packet.

Figure 2:
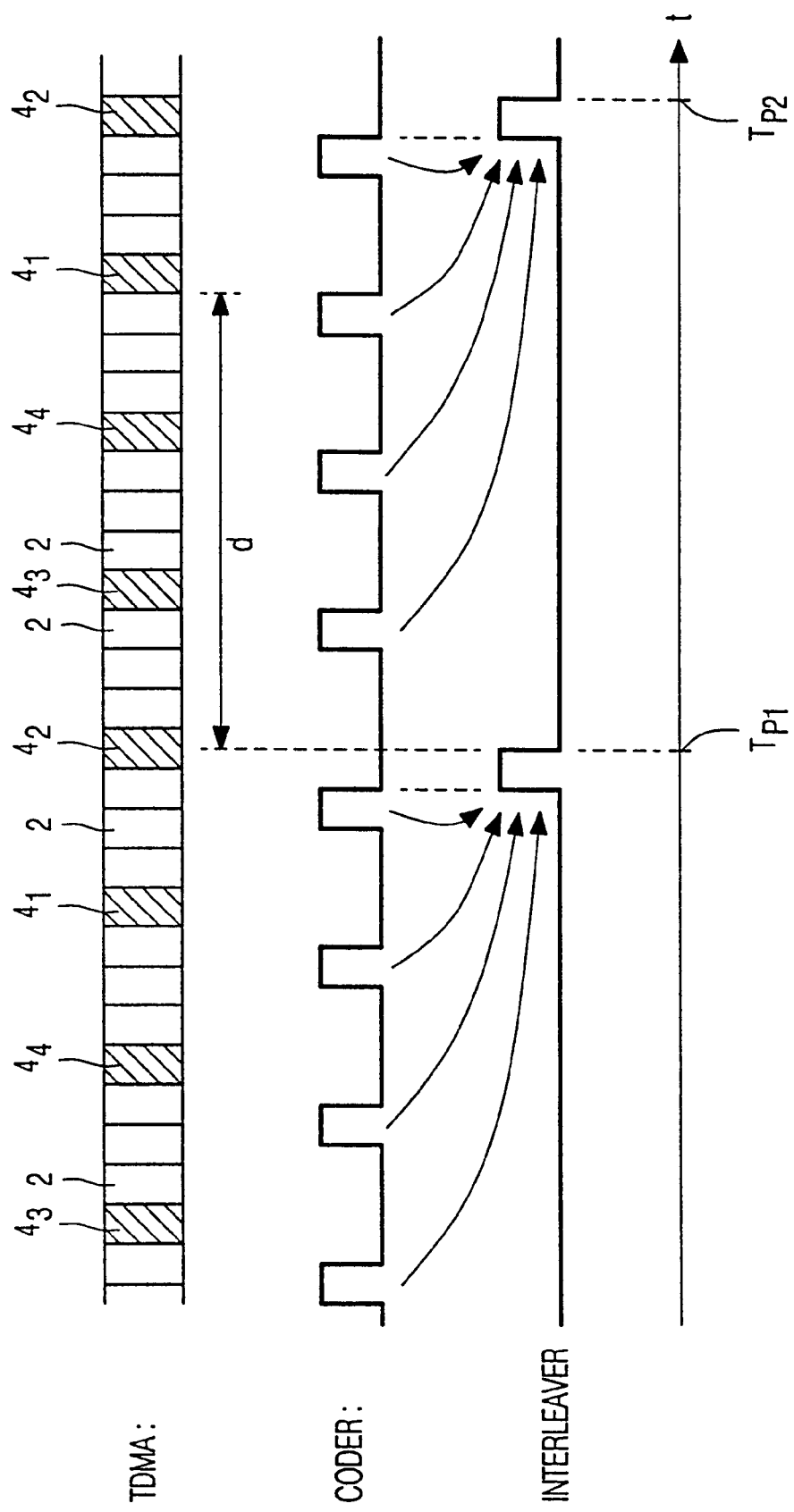
FIG. 2 shows the possible time delays incurred in a TDMA system employing interleaving.

This delay can become greater when interleaving systems are employed. FIG. 2 illustrates the allocation of data to time segments in a channel when block interleaving is used. Various interleaving techniques exist to enable the detection and correction of errors, for example burst errors.

In FIG. 2 the allocated time segments of the channel are grouped into blocks of four, $4_1$ to $4_4$. As in the example of FIG. 1, the coder quantises the input data with the same sampling rate as the rate of occurrence of allocated time segments. The interleaving system depicted in FIG. 2 combines data from four sequential data packets to produce four new packets for transmission which are less susceptible to errors. The four preceding data packets are spread over four subsequent allocated time segments $4_1$ to $4_4$. The interleaver carries out the interleaving function every time four data packets are received, and the output of the interleaver is a set of four data packets for transmission in four consecutive allocated time segments. The output of the interleaver at time $T_{p1}$ and $T_{p2}$ represents the time when data packets are ready for transmission.

When the allocation of time segments to the channel is carried out under the control of an independent clocking system, significant delays may be introduced as shown in FIG. 2. In particular, the transmission system and the reception system mutually perform the allocation of time segments to each interleaving block, which may give rise to the delay d shown in FIG. 2 between the time $T_{p1}$ when a block of four interleaved data signals are ready for transmission and the beginning of the first time segment $4_1$ of a block of interleaved timed segments.

Of course, many different interleaving techniques are possible, and data from different sources can be combined to increase further the diversity.

The invention provides synchronisation of the allocated time segments 4 of the TDMA channel with the arrival of data ready for transmission from the coder, or from the interleaver in an interleaved system.

Figure 3:
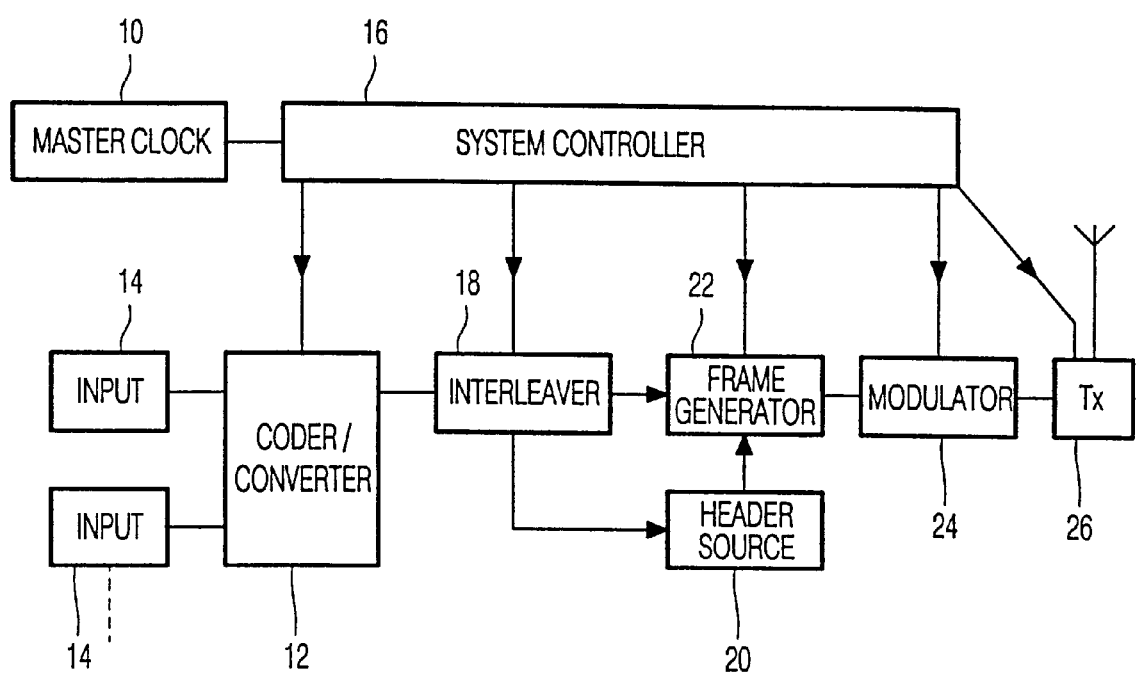
FIG. 3 shows a transmission system of the invention for reducing the delays shown in FIGS. 1 and 2.

FIG. 3 shows a transmission system according to the invention for implementing the synchronisation described above.

The transmitter shown in FIG. 3 comprises a master clock 10 which is synchronised with a clock in the receiving circuitry (not shown). The master clock governs the division of the transmission channel into time segments for the purposes of the time division multiple access coding and also governs the operation of a coder/converter 12 which is responsible for formatting the input data from inputs 14. The master clock 10 may include a receiver for receiving the master clock signal from a distant source, or the master clock 10 may itself generate the timing signals, which may then be transmitted using a dedicated channel by the transmitter.

The signal from the master clock 10 is supplied to a system controller 16 which controls the operation of the transmitter using timing derived from the clock signal.

The data supplied by the inputs 14 may be continuous streams of data, in which case the coder/converter 12 samples the data stream to form data packets suitable for transmission in time segments of the transmission channel. For speech or video data, the coder preferably comprises a codec. Alternatively, the input data may have been relayed from a remote source, either by a wired link or by a radio link and may therefore already comprise digitised packet data. In this case the coder/converter 12 converts the data into a suitable form for the remainder of the transmitter circuitry. The output of the coder 12 is a series of data packets each comprising a quantity of data suitable for the transmission in an allocated time segment of the transmission channel. Alternatively, it may be possible to transmit more than one data packet in each time segment of the channel.

The data packets are supplied to an optional interleaver, which may be introduced to increase diversity in the transmitted channel. The interleaver 18 may combine a series of data packets for transmission during a subsequent series of allocated time segments. Preferably, an integer number of data packets are transmitted in a block of time segments linked by the interleaving structure. The timing and nature of interleaving employed may be conveyed to the receiver by means of a header on each frame of transmitted data, and for this purpose the interleaver 18 is connected to a header source 20 and to a frame generator 22.

The header source may also include an indication of the TDMA timing instants, if the transmitter is provided with the capability of adjusting the timing governing the division of the channel into time segments for the TDMA coding.

The frames produced by the frame generator 22 for transmission over the channel are then modulated by an appropriate modulation technique by the modulation unit 24. The modulated signal is then transmitted by a transmitter 26.

The operation and timing of the interleaver, frame generator, modulator and transmitter are each governed by the system controller 16 using timing information from the master clock 10.

In the transmission system of the invention the operation of the coder 12 is synchronised with the allocation of time segments of the transmission channel.

In the case of continuous data from the inputs 14, the sampling performed by the coder may be controlled by the system controller 16 with timing such that the subsequent production of a modulated frame for transmission coincides with the beginning of a previously allocated time slot. This eliminates the delay d explained with reference to FIG. 1.

If an interleaver is employed, the sampling instants for the coder may again be selected such that the modulated interleaved signal becomes available to coincide with the beginning of an allocated time segment. In addition, the interleaving technique may be controlled in other ways. For example, if the interleaving system results in blocks of time segments being allocated for interleaved blocks of data it may be desirable to redefine which time segments are the first in each block of time segments. This enables the delay d explained with reference to FIG. 2 to be reduced. Of course, any alterations to the interleaving scheme employed must be transmitted to the receiver by means of information in the header source, which indicates timing details concerning the block of interleaved time segments.

When the input data is received from a remote source and is not generated within the transmitter, it will not be possible to alter the timing of arrival of data packets. In this case, the invention enables the time division of the channel to be shifted so that an allocated time slot becomes available each time a data packet is ready for transmission. Of course, altering the timing of the channel division has an impact on the signals transmitted over the channel during time periods allocated to other data inputs. Each data stream for transmission over the shared channel may therefore include a priority indicator to signify which data signals require transmission with minimum delay and to indicate those signals where delay is not a critical factor.

Interrogation by the system controller of the receiving stations could be performed in order to obtain permission to alter the timing of channel time segments. This may be achieved using a dedicated channel of the transmitter, or by sending information using data packet headers to the receivers concerned.

From reading the present disclosure, other modifications will be apparent to persons skilled in the art. Such modifications may involve other features which are already known in the design and use of electrical or electronic circuits and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method of transmitting communication signals over a channel using time division multiple access sharing of the channel comprising:

dividing a data sequence of each of said communication signals into data packets for transmission over the channel during respective subsequent time segments of the channel, allocating the time segments of the channel to respective ones of said data packets; and synchronizing the dividing of each of said communication signals into the data packets with the allocating of the time segments of the channel to the respective ones of said data packets.

2. A method as claimed in claim 1, wherein sampling of each communication signal to create the data packets is timed so that an allocated time segment is available shortly after creation of the data packet.

3. A method as claimed in claim 2, wherein a codec provides the data packets.

4. A method as claimed in claim 1, wherein the allocating of the time segments is varied so that a time segment is allocated to a communication signal shortly after creation of a data packet.

5. A method of transmitting communication signals over a channel using time division multiple access sharing of the channel, comprising:

dividing a data sequence of each of said communication signals into data packets for transmission over the channel during respective subsequent time segments of the channel;

allocating the time segments of the channel to respective ones of said data packets; and synchronizing the dividing of each of said communication signals into the data packets with the allocating of the time segments of the channel to the respective ones of said data packets;

wherein each of said data packets is transmitted using a block of successive time segments of the channel, such that the dividing of each of said communication signals into the data packets further comprises spreading of data from each of said data packets into data portions for respective time frames of the block, and timing of start of the block of time segments is synchronised with creation of the data portions.

6. A method as claimed in claim 5, wherein sampling of the communication signals to create the data packets is timed so that a first time segment within one of the blocks is available shortly after generation of the data portions.

7. A method as claimed in claim 5 wherein selection of which time frames form one of the blocks is made so that a first time frame of a block is available shortly after creation of the data portions.

8. A radio transmission system comprising:

processing means for processing input data to produce streams of data packets, allocating means for allocating a series of time frames of a transmission channel of the transmission system to each of the streams of data packets, modulation means for modulating the transmission channel with a modulation signal representing the streams of data packets, and a system controller which receives a clock signal for governing operation of the processing means and of the allocating means, wherein production of the streams of data packets is synchronised by the system controller with the allocation of time frames to respective ones of the streams of data packets.

9. The method as claimed in claim 1, wherein the synchronizing act includes timing modulation of the data packets for transmission to coincide with beginning of a previously allocated ones of the time segments.

10. The method as claimed in claim 1, further comprising interleaving a first set of the data packets to form interleaved data packets; wherein the synchronizing act includes timing modulation of the interleaved data packets for transmission to coincide with beginning of a previously allocated ones of the time segments.

11. The method as claimed in claim 1, further comprising:

combining data from sequential data packets to form combined data packets; and spreading the combined data packets over subsequent allocated ones of said time segments.

12. The method as claimed in claim 1, further comprising spreading data from each of said data packets into data portions for respective time frames of a block of successive time segments of the channel, wherein the synchronizing act synchronises start of the block of successive time segments with creation of the data portions.

13. The radio transmission system as claimed in claim 8, wherein each of said data packets is transmitted using a block of successive time segments of the channel, such that data from each of said data packets are spread into data portions for respective time frames of the block, and timing of start of the block of time segments is synchronised with creation of the data portions.

14. A transmission system comprising:

a converter which converts input data into data portions;

a modulator which modulates the data portions; and a controller connected to the converter and the modulator, said controller allocating time segments used for transmitting said data portions, wherein said controller further synchronizes the allocating of the time segments with the data portions so that each of the time segments is available shortly after generation of a respective one of said data portions for transmission thereby minimizing a delay between said each of the time segments and said respective one of said data portions.

15. The transmission system of claim 14 further comprising an interleaver which combines the data portions into combined data; said interleaver being connected to said controller; wherein said controller synchronizes the allocating of the time segments with said combined data with so that said time segments are available for transmission shortly after generation of said combined data.

* * * * *